United States Patent [19]

Dupuy et al.

[11] Patent Number: 5,612,992

[45] Date of Patent: Mar. 18, 1997

[54] METHOD OF MANAGING TRANSMISSION ERRORS BETWEEN A BASE STATION AND A TRANSCODER IN A DIGITAL RADIOCOMMUNCATIONS SYSTEM, AND A BASE STATION AND TRANSCODER CORRESPONDING TO THE METHOD

[75] Inventors: Pierre Dupuy, Paris; Laurent Cruchant, Rueil Malmaison; André Jarvis, Bougival; Jean-Philippe Poirault, Bois-Colombes, all of France

[73] Assignee: Alcatel N.V., Rijswijk, Netherlands

[21] Appl. No.: 495,615

[22] Filed: Aug. 3, 1995

[30] Foreign Application Priority Data

Feb. 26, 1993 [FR] France ................... 93 02309

[51] Int. Cl.⁶ ................ H04Q 7/30; H04Q 7/34
[52] U.S. Cl. ................ 379/59; 379/63; 371/31; 375/358; 455/33.1
[58] Field of Search ................ 379/58, 59, 63; 455/33.1; 375/227, 357, 356, 358, 224, 219; 370/95.1, 95.3; 371/31

[56] References Cited

U.S. PATENT DOCUMENTS 5,077,741  12/1991  Kotzin ................ 371/30
5,097,507  3/1992   Zinser et al. ................ 381/31
5,361,399  11/1994  Linquist et al. ................ 455/56.1
5,475,686  12/1995  Bach et al. ................ 370/84
5,537,414  7/1996   Takiyasu et al. ................ 370/95.1

FOREIGN PATENT DOCUMENTS

0448015A2  9/1991   European Pat. Off. .
0462728A2  12/1991  European Pat. Off. .
0489993A1  6/1992   European Pat. Off. .

*Primary Examiner*—Curtis Kuntz
*Assistant Examiner*—Nay Aung Maung
*Attorney, Agent, or Firm*—Sughrue, Mion, Zinn, Macpeak & Seas

[57] ABSTRACT

The invention relates to a method of managing transmission errors between a base station and a transcoder, in a digital radiocommunications system for mobile stations, in which method the transcoder, in the presence of a transmission error, systematically inserts (29, 221, 228) an error message in a frame addressed to the base station without interrupting useful data transmission to the base station, and in which method the base station decides to interrupt data transmission to the transcoder (down direction) and generates an up-direction transmission interruption request when the transmission errors detected in the down direction and/or reported by an error message in the up direction satisfy predetermined conditions. In this way, all call-interruption decisions are centralized in the base station.

10 Claims, 2 Drawing Sheets

METHOD OF MANAGING TRANSMISSION ERRORS BETWEEN A BASE STATION AND A TRANSCODER IN A DIGITAL RADIOCOMMUNCATIONS SYSTEM, AND A BASE STATION AND TRANSCODER CORRESPONDING TO THE METHOD

FIELD OF THE INVENTION

The invention relates to digital cellular radiocommunications. More precisely, the invention relates to managing transmission errors between a base station or base transceiver station (BTS) and a transcoder or transcoder/rate adaptor unit (TRAU).

BACKGROUND OF THE INVENTION

Cellular radiocommunications systems are based on subdividing a geographical area into small portions or cells, each of which is served by one or more base stations. Such subdivision into cells makes it possible to optimize use of the radio spectrum since a plurality of cells can use the same portion of the spectrum.

Each base station can communicate via radio links with a plurality of mobile stations travelling in its cell. Furthermore, the base stations are connected to a switching center or mobile switching center (MSC) which establishes connection between a mobile station and a remote terminal (e.g. a subscriber of the switched network or another mobile station). The switching center and the base station are interconnected via a PCM (pulse coded modulation) line.

The cost of using a PCM line is very high. It is therefore desirable to optimize use of such a line. To this end, a transcoder (or TRAU) is generally inserted between the base stations and the switching center, so that data interchange (whether it be data or speech that is actually interchanged) between a base station and the transcoder is compressed.

Both the transcoder and the base station include compression and decompression means. For example, the data-rate of a call may be reduced from 64 kbit/s to 16 kbit/s in the GSM system ("groupe special mobile" or global system for mobile communications) to which the invention advantageously applies. The improvement obtained in such a system is therefore by a factor of 4.

In order to achieve an optimum improvement, it is desirable for the compression to take place over as long a distance as possible. In this way, in general, the transcoder is installed directly on the same site as the switching center.

In any communications systems, transmission errors can appear, for many reasons (a line being cut off, external disturbance, breakdowns, etc.). The link between a transcoder and a base station is no exception to this rule. As a result, it is necessary to detect and manage such transmission errors.

In a GSM radiocommunications system, error management is performed as follows:
- if the base station detects synchronization loss for one second, it transmits an alarm to a BSC (base station controller) that controls said base station, which BSC then decides to interrupt the call; and
- if the transcoder detects synchronization loss for one second, it stops transmitting so as to transmit an emergency alarm (in compliance with GSM Recommendation 08-60). On receiving the alarm, the base station warns the BSC that controls it, which BSC then decides to interrupt the call.

That method suffers from two major drawbacks.

Firstly, the transcoder has to interrupt the flow of data to indicate a transmission problem. Such an interruption can prove to be superfluous. It is not infrequent for a call to be disturbed in one transmission direction only. Therefore, just because the transcoder detects disturbances in the up direction (from the base station to the transcoder), it does not mean the link is disturbed in the down direction (from the transcoder to the base station). In which case, it is unnecessary and even undesirable to interrupt data transmission to the base station.

Secondly, it appears that the length of the time delay (1 second) before concluding that synchronization loss has occurred is too short for many operators (e.g. when the network used is of medium or low quality). It is therefore desirable for this value to be parameterizable.

This poses few problems for the base stations, in which the operating software is downloaded. However, the transcoder software is conventionally stored in a read-only memory, and is therefore not downloadable. Therefore, in order to modify the length of the time delay, it is necessary to change the memory of the transcoder, which is a costly operation.

Another possibility consists in providing a transcoder configuration message for modifying the length of the time delay. But, in addition to making it necessary to define a new message to the transcoder, that possibility makes it necessary for the length of the time delay to be identical regardless of the BTS to which the transcoder is connected. This gives rise to drawbacks when the quality of the PCM lines between a BSC and the various BTSs that it controls is not constant.

SUMMARY OF THE INVENTION

An object of the invention is to mitigate the various drawbacks of the prior art.

More precisely, an object of the invention is to provide a method of managing transmission errors between a transcoder and a base station, in a digital radiocommunications system, which method does not require transmission from the transcoder to be interrupted when the transcoder detects transmission errors.

Another object of the invention is to provide such a method that makes it possible to control the length of the time delay implemented for deciding that synchronization loss has occurred.

A further object of the invention is to provide such a method that does not require complex processing either in the base station, or in the transcoder. In particular, an object of the invention is to provide a method in which no parameterizing is necessary in the transcoder.

Yet another object of the invention is to provide such a method that is compatible with the GSM specifications, and in particular that requires no significant modification of the GSM frame as defined by the standard.

The invention achieves these objects and others that appear below by providing a method of managing transmission errors between a base station and a transcoder, in a digital radiocommunications system for mobile stations, said system comprising a plurality of base stations, each of which controls a plurality of mobile stations via radio links;
a signal from a mobile station to a remote terminal (up direction) being conveyed:
from said mobile station to a base station via a radio link;

from said base station to a transcoder in the form of data frames containing check data and useful data, said useful data being encoded by using encoding that is recognized by said base station and by said transcoder; and from said transcoder to a switching center establishing connection to said remote terminal; and a signal from said remote terminal to said mobile station (down direction) being conveyed symmetrically;

said transcoder performing the following operations:

receiving and decoding the frames transmitted by said base station;

detecting transmission errors in the up direction by analyzing the received and decoded frames;

in the presence of a transmission error in the up direction, systematically inserting an error message in a frame addressed to said base station without interrupting useful data transmission to said base station; and interrupting data transmission to said base station on detection of an up-direction transmission interruption request generated by said base station;

and said base station performing the following operations:

receiving and decoding frames transmitted by said transcoder;

detecting transmission errors in the down direction by analyzing the received and decoded frames; and interrupting data transmission to said transcoder (down direction) and generating an up-direction transmission interruption request when the transmission errors detected in the down direction and/or reported by an error message in the up direction satisfy predetermined conditions.

In this way, all call-interruption decisions are centralized in the base station, regardless of whether the transmission errors are detected by the transcoder or by the base station. So long as it has not received an interruption command, the transcoder continues to transmit data (master/slave relationship, with the transcoder being the slave).

Advantageously, said operation of detecting errors includes a step of detecting synchronization loss in said received and decoded data.

In a GSM system, this step involves recognizing the synchronization bits distributed in each frame.

In a preferred implementation of the invention, said operation of inserting an error message consists in changing the value of at least one check bit of one of said frames.

In a GSM frame, said bit may be any one of bits C12 to C15 which are currently available.

In this way, the structure of the frame is not modified, and data transmission is not disturbed.

Preferably, said base station uses two counters, a first counter counting the number of errors in the up direction during a first predetermined lapse of time, and a second counter counting the number of errors in the down direction during a second predetermined lapse of time, and said base station decides to interrupt a call when the value of at least one of said counters exceeds a predetermined threshold.

In this way, the base station can manage the two types of error without significantly increasing the complexity of the processing.

Advantageously, said first predetermined lapse of time and/or said second predetermined lapse of time have parameterizable durations. Said parameterizable duration may be different for each base station (17), regardless of whether or not the base stations are controlled by the same base station controller (BSC).

In this way, error management can be adapted to different operators. Since the base station software is generally downloadable, it is easy to modify this time-delay value.

In an advantageous implementation, already provided by the GSM system (p. 16, §4.3, point i of recommendation 08.60), said transcoder interrupts a call in progress when it receives a frame that it transmitted itself.

The transcoder may also interrupt the call by performing the following operations:

counting the number of errors that appear during a third predetermined lapse of time;

activating an emergency clock when said number of errors is greater than a predetermined threshold; and interrupting the call if said emergency clock reaches a predetermined time-delay value, and if said transcoder receives a call interruption message.

The invention also provides transcoders and base stations implementing the above-described method.

BRIEF DESCRIPTION OF THE DRAWINGS

Other characteristics and advantages of the invention will appear on reading the following preferred implementation given by way of non-limiting example with reference to the accompanying drawings, in which.

DESCRIPTION OF THE PREFERRED EMBODIMENT

The implementation described below applies to the GSM radiocommunications system, and more precisely to the second generation (and subsequent generations) of the GSM system, currently being developed. Naturally however, the invention may also be applied to other radiocommunications systems.

Figure 1:
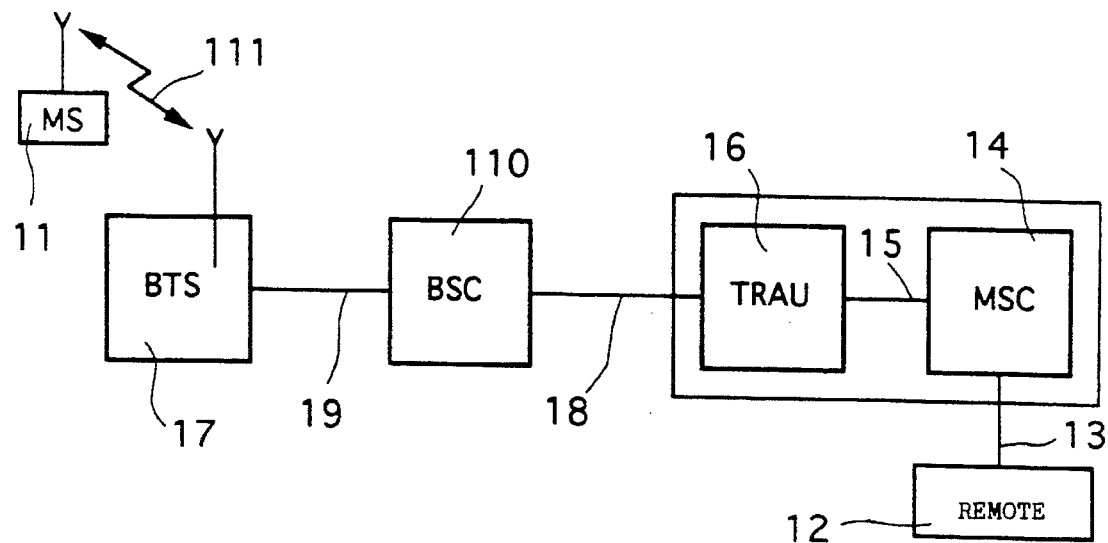
FIG. 1 shows the structure of a cellular radiocommunications network, such as GSM network, that is known per se.

FIG. 1 is a diagram showing the various elements implemented for a call between a mobile station (MS) 11 and a remote subscriber 12, in the case of GSM.

Consideration is given to the case of a speech signal. The remote terminal is a conventional telephone set which uses the switched telephone network (STN) 13. It is connected to a mobile switching center (MSC) 14 which has two tasks:

it manages calls (transparently for the remote terminal); in particular it allocates a transmission channel to a call, and then informs the base station of the existence of a call; and it digitizes the analog speech signal received from the remote terminal, at a frequency of 8 kHz (and, in the other call direction, it performs symmetrical digital-to-analog conversion).

The digital signal 15 is transmitted at a data-rate of 64 kbit/s to a transcoder (TRAU) 16 which compresses the speech. This compression makes it possible to reduce the data-rate of a call from 64 kbit/s to 13 kbit/s. In practice, a data-rate of 16 kbit/s is allocated to a call (3 kbit/s being reserved for conveying various information). Compression by a factor of 4 is thus obtained.

Such compression is necessary because the switching center 14 and a base station (BTS) 17 are interconnected via a PCM line 18, 19 (e.g. operating at 2,048 kbit/s). The cost of using such PCM lines is very high. It is therefore necessary to compress the data and to multiplex a plurality of calls, so as to optimize use of the PCM lines.

Conventionally, a 2,048 kbit/s PCM line is subdivided into 32 64 kbit/s channels comprising 31 signalling or speech channels (sampled at 8 kHz) and one PCM check channel used for checking that the PCM line is operating properly. The compression enables 4 calls to be conveyed in each channel.

In practice, the transcoder 16 is connected to a base station controller 110, via a first PCM line 18, then to the base station 17 via a second PCM line 19. The task of the controller 110 is essentially to provide connections. It is transparent to the calls.

The GSM network uses a tree structure including, for any given area (e.g. a country) a few switching centers (e.g. about ten). Each switching center controls a set of base station controllers. Each controller manages a plurality of base stations, each of which controls a plurality of mobile stations (e.g. about sixty).

The base station 17 communicates with the mobile station 11 via a radio link.

Naturally, the data is conveyed symmetrically in the direction going from the mobile station 11 to the remote terminal 12 (referred to as the "up" direction, by convention, the above-described direction being the "down" direction (as seen from the mobile)).

Data transmission is performed in a similar manner.

The invention specifically concerns managing transmission errors over the PCM lines 18, 19 between the base station 17 and the transcoder 16.

Currently, (in the first-generation system) such management is performed as follows:

In the up direction: if a transmission error is detected by the transcoder for one second, the transcoder ceases to transmit data to the base station in order to transmit an "emergency message" constituted by a series of consecutive zeros.

The base station detects this emergency alarm and informs the controller BSC which decides to interrupt the call and which then returns to the transcoder the frames that the transcoder is transmitting. When the transcoder recognizes the frames that it has transmitted, it interrupts the call.

In the down direction: when a transmission error is detected by the base station, the base station decides to interrupt the call in the above-described manner.

Another method of interrupting a call also exists: the base station may transmit "idle pattern" data constituted by successive "01" sequences. When the transcoder recognizes such idle pattern data, it decides to interrupt the call.

Transmission errors may be due, for example, to error bursts, to noise (random errors), or to cut-offs (e.g. when switching from one set to another in the event of breakdown).

Detecting a transmission error (in the transcoder or in the base station) comprises the following steps:

once three consecutive synchronization defects have been detected, a time delay of one second is activated; and once the time delay has elapsed, and if operation remains bad, a transmission error is considered to have been detected.

A synchronization defect is detected by analyzing the GSM frame.

After a header constituted by 16 zeros, then 16 check bits, a GSM frame systematically includes a synchronization bit equal to 1 every 16 bits. If a received synchronization bit is not equal to 1, a synchronization defect is considered to have been detected.

The invention is based on transferring all of the call-interruption decisions to the base station. The transcoder never takes an interruption decision on its own when it detects errors.

Figure 2:
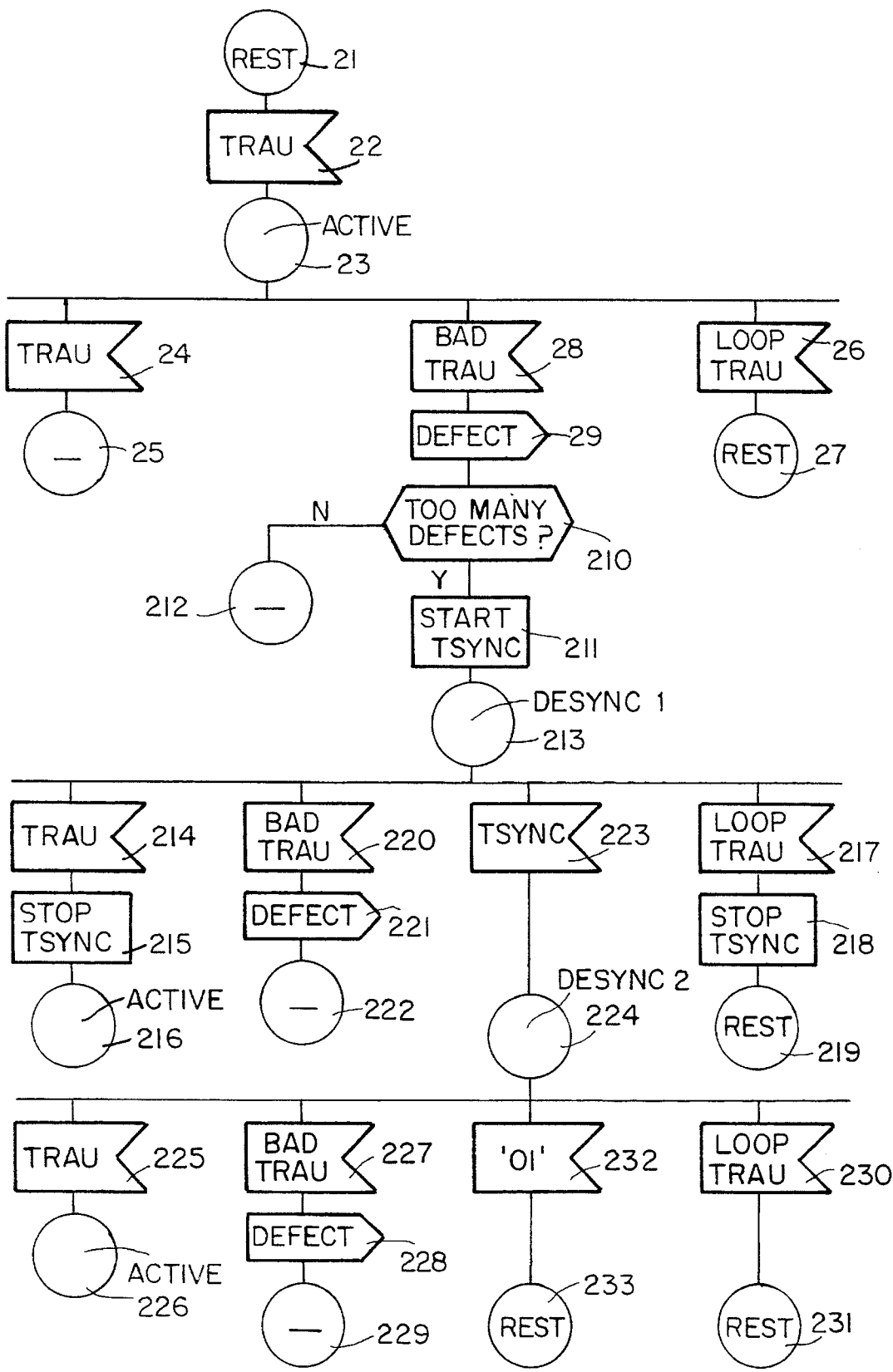
FIG. 2 is a state diagram showing how a transcoder (TRAU) operates using the method of the invention.

The diagram in FIG. 2 shows how the transcoder operates in accordance with the invention.

In the absence of a call, the transcoder is at rest 21. When it receives (22) a "TRAU" frame (i.e. a frame compressed by the base station), it goes into active mode 23. The transcoder is a "slave" to the base station: it is the base station that informs it of the start of a call. The transcoder does not take the initiative for a call.

Three cases may then occur:

the frame is received without any errors (TRAU): the transcoder remains in the active mode 25;

the frame that the transcoder has just transmitted is received 26 (loop TRAU), with the controller returning the transmitted frames: the transcoder returns to the rest mode 27; or a frame having a synchronization error is received 28 (bad TRAU): error information is systematically transmitted 29 to the base station, without interrupting transmission of the useful signal.

After error information has been transmitted 29, consideration (210) is given to the number of consecutive defects. If there are too many defects (in practice, if there are more than three consecutive errors), a time delay is started (211). Otherwise, the transcoder remains in the active mode 212.

This time delay has a duration $T_{synch}$, e.g. equal to 1 second. So long as the time delay is in progress (213) (a step referred to as "DESYNC1", for "phase-1 desynchronization"), the three above-described situations may occur:

a frame with no errors is received 214 (TRAU): the time delay is interrupted 215 (stop $T_{synch}$), and the transcoder returns to the active mode 216;

the frame that the transcoder has just transmitted is received 217 (loop TRAU): the time delay is interrupted (218), and the transcoder goes into rest mode 211; or a frame having a synchronization error is received 220: a new item of error information is transmitted (221), and the time delay continues to run (222).

At the end of the time delay (once information indicating that $T_{synch}$ has elapsed is received 223), the transcoder goes into the second phase of desynchronization (DESYNC2) 224.

Four situations may then be encountered:

a frame with no error is received 225: the transcoder returns to the active mode 226;

a frame having a synchronization error is received 227: information indicating a defect is transmitted 228, and the transcoder remains in the current state 229 (the transcoder continues to transmit data);

the frame that the transcoder has just transmitted is received 230 (loop TRAU): the transcoder goes into rest mode 231; or a series of "01" idle pattern data is received 232: the transcoder goes into rest mode 233; it should be noted that the idle pattern data is taken into account only once the time delay $T_{synch}$ has elapsed.

In this way, the transcoder alone never takes the decision to cease transmission: it goes into the rest mode only when the controller BSC returns its own frames, or when it receives idle pattern data. However, as soon as an error is detected, the transcoder informs the base station.

Synchronization error management is therefore centralized in the base station, the transcoder confines itself to reporting its problems to the base station.

Synchronization error information may, for example, be transmitted to the base station by using one or more of the check bits available in each "TRAU" frame, such as bits C12 to C15 (using the numbering chosen in GSM Standard 08.60), e.g. check bit C12.

Figure 3:
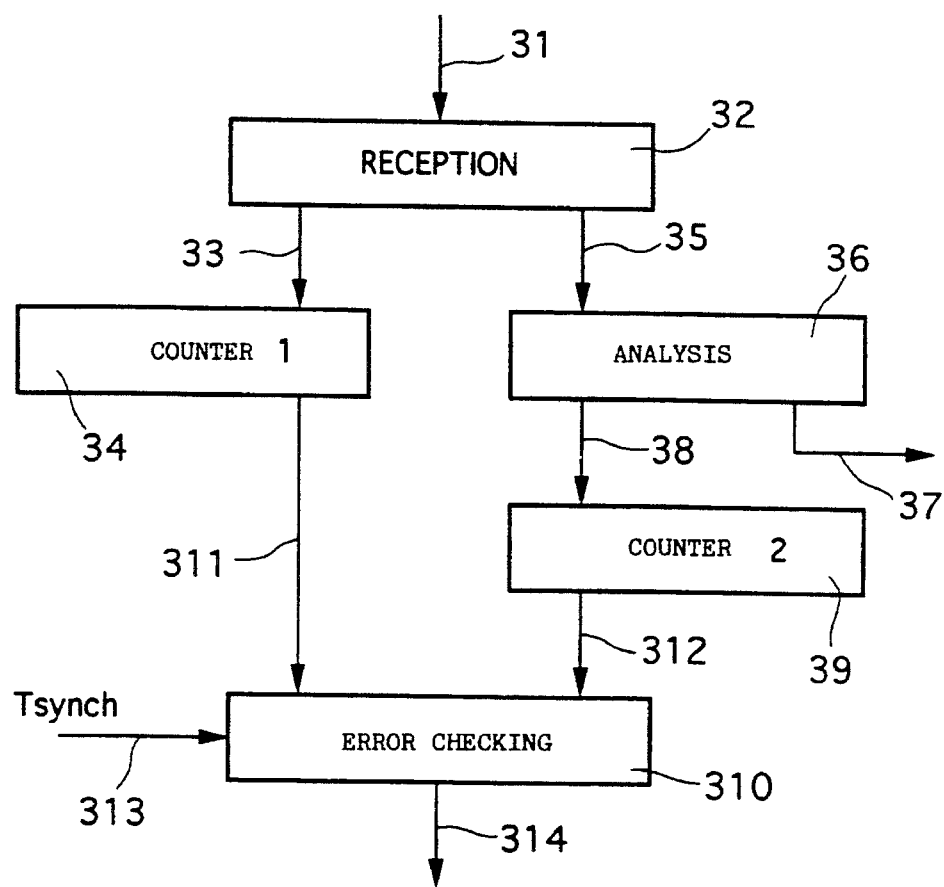
FIG. 3 is a simplified block diagram showing how a base station (BTS) operates in accordance with the invention.

FIG. 3 is a diagram showing how the base station associated with the transcoder operates in accordance with the invention.

The frames 31 received from the transcoder are firstly decompressed 32 so as to extract therefrom in particular the various check bits. If bit C12 is equal to 1 (error detected by the transcoder), incrementation information 33 is transmitted to a first counter 34 for counting the synchronization errors seen by the transcoder.

Furthermore, the received data 35 is analyzed (36) so as to extract therefrom data 37 (so that it can be transmitted to the mobile station). In addition, the synchronization errors are detected, and incrementation information 38 is transmitted to a second counter 39 when an error is detected.

A transmission error checking step 310 takes into account both the number 311 of errors seen by the transcoder, and also the number of errors 312 seen by the base station.

As a function of specific analysis of these two values 311 and 312, and of a time-delay value $T_{synch}$ 313, this error checking step 310 decides, whenever necessary, to warn the controller BSC so that it interrupts the call. A corresponding end-of-call command 314 is then generated.

Advantageously, the time-delay value $T_{synch}$ is parameterizable. For example, it may be downloaded into the base stations. For a good-quality PCM line, $T_{synch}$ may be equal to 1 second. However it is preferably longer if the PCM lines are of medium quality.

Optionally, the $T_{synch}$ values may vary from one base station to another within the same network as a function of local conditions, statistics, etc.

The invention offers in particular the following advantages:

- the transcoder is no longer obliged to interrupt transmission when it detects errors;
- the value $T_{synch}$ is parameterizable (and it can be downloaded);
- no modification needs to be made in the transcoders, even when the value of $T_{synch}$ is modified; and
- error management is centralized.

We claim:

1. A method of managing transmission errors between a base station (17) and a transcoder (16), in a digital radiocommunications system for mobile stations, said system comprising a plurality of base stations, each of which controls a plurality of mobile stations via radio links;

a signal from a mobile station (11) to a remote terminal (12) (up direction) being conveyed:

from said mobile station (11) to a base station (17) via a radio link;

from said base station (17) to a transcoder (16) in the form of data frames containing check data and useful data, said useful data being encoded by using encoding that is recognized by said base station (17) and by said transcoder (16); and from said transcoder (16) to a switching center (14) establishing connection to said remote terminal (12); and a signal from said remote terminal (12) to said mobile station (11) (down direction) being conveyed symmetrically;

said method being characterized in that said transcoder (16) performs the following operations:

receiving and decoding (22, 24, 28, 214, 220, 225, 227) the frames transmitted by said base station (17);

detecting (28, 220, 227) transmission errors in the up direction by analyzing the received and decoded frames;

in the presence of a transmission error in the up direction, systematically inserting (29, 221, 228) an error message in a frame addressed to said base station (17) without interrupting useful data transmission to said base station (17); and interrupting (27, 219, 231, 233) data transmission to said base station (17) on detection (26, 217, 230, 232) of an up-direction transmission interruption request (314) generated by said base station (17);

and in that said base station (17) performs the following operations:

receiving and decoding (32, 36) frames transmitted by said transcoder;

detecting (36) transmission errors (38) in the down direction by analyzing the received and decoded frames; and interrupting data transmission to said transcoder (down direction) and generating (310) an up-direction transmission interruption request (314) when the transmission errors detected in the down direction (312) and/or reported by an error message in the up direction (311) satisfy predetermined conditions.

2. A method according to claim 1, characterized in that said operation of detecting errors (28, 220, 227, 36) includes a step of detecting synchronization loss in said received and decoded data.

3. A method according to claim 1, characterized in that said operation of inserting (29, 221,228) an error message consists in changing the value of at least one check bit of one of said frames.

4. A method according to claim 3, characterized in that said bit is any one of bits C12 to C15 in the GSM frame.

5. A method according claim 1 characterized in that said base station (17) uses two counters (34, 39), a first counter (34) counting the number (311) of errors in the up direction during a first predetermined lapse of time (313), and a second counter (39) counting the number (312) of errors in the down direction during a second predetermined lapse of time (313);

and in that said base station (17) decides to interrupt (314) a call when the value of at least one of said counters (34, 39) exceeds a predetermined threshold.

6. A method according to claim 5, characterized in that said first predetermined lapse of time (313) and/or said second predetermined lapse of time (313) have parameterizable durations.

7. A method according to claim 6, characterized in that said parameterizable duration is different for each base station (17), regardless of whether or not the base stations are controlled by the same base station controller (BSC).

8. A method according to claim 1, characterized in that said transcoder (16) performs the following operations:

counting (210) the number of errors that appear during a third predetermined lapse of time;

activating (211) an emergency clock when said number of errors is greater than a predetermined threshold; and interrupting (233) the call if said emergency clock reaches (223) a predetermined time-delay value, and if said transcoder (16) receives (232) a call interruption message.

9. A transcoder performing the method according to claim 1, said transcoder being characterized in that it includes detection means for detecting a transmission error in a signal transmitted by a base station, and transmission means for transmitting a message to said base station without interrupting useful data transmission.

10. A base station implementing the method according to claim 1, characterized in that it includes counting means (34, 39) for counting firstly the errors detected in the data transmitted by said transcoder, and secondly the errors reported by an error message transmitted by said transcoder.

* * * * *